(12) United States Patent
Kim et al.

(10) Patent No.: US 12,130,851 B2
(45) Date of Patent: Oct. 29, 2024

(54) METHOD AND SYSTEM FOR IMPROVING PERFORMANCE OF TEXT SUMMARIZATION

(71) Applicant: 42Maru Inc., Seoul (KR)

(72) Inventors: Dong Hwan Kim, Seoul (KR); Han Su Kim, Bucheon-si (KR); Woo Tae Jeong, Seongnam-si (KR); Seung Hyeon Lee, Yongin-si (KR); Chang Hyeon Lim, Seoul (KR)

(73) Assignee: 42Maru Inc., Seoul (KR)

( * ) Notice: Subject to any disclaimer, the term of this patent is extended or adjusted under 35 U.S.C. 154(b) by 0 days.

(21) Appl. No.: 18/209,703

(22) Filed: Jun. 14, 2023

(65) Prior Publication Data
US 2023/0325423 A1   Oct. 12, 2023

Related U.S. Application Data

(63) Continuation of application No. 17/125,991, filed on Dec. 17, 2020, now Pat. No. 11,727,041.

(30) Foreign Application Priority Data

Dec. 3, 2020   (KR) ........................ 10-2020-0167223

(51) Int. Cl.
*G06F 16/34*   (2019.01)
*G06F 16/33*   (2019.01)
(Continued)

(52) U.S. Cl.
CPC ........ *G06F 16/345* (2019.01); *G06F 16/3347* (2019.01); *G06F 16/9024* (2019.01);
(Continued)

(58) Field of Classification Search
CPC .. G06F 16/345; G06F 16/334; G06F 16/9024; G06F 40/279; G06F 40/30; G06F 40/40; G06N 3/08
(Continued)

(56) References Cited

U.S. PATENT DOCUMENTS 10,402,495 B1   9/2019   Rush et al.
2018/0300400 A1   10/2018   Paulus

FOREIGN PATENT DOCUMENTS

JP   2020520492   7/2020
KR   101508260   4/2015
(Continued)

OTHER PUBLICATIONS

Notice of Allowance issued Mar. 4, 2023 for Korea App. No. 10-2020-0167223 w/ English Translation.
(Continued)

*Primary Examiner* — Thierry L Pham
(74) *Attorney, Agent, or Firm* — Sughrue Mion, PLLC

(57) ABSTRACT

The invention relates to a method and a system for improving performance of text summarization and has an object of improving performance of a technique for generating a summary from a given paragraph. According to the invention to achieve the object, a method for improving performance of text summarization includes: an a step of generating an embedding vector by vectorizing a natural language-based context; a b step of generating a graph using the embedding vector and calculating a first likelihood of each of at least one node included in the graph; a c step of generating a second likelihood by assigning a weight to the first likelihood according to a result of comparing at least one node included in the graph with the context; and a d step of calculating a third likelihood for all candidate paths present in the graph based on the second likelihood, select-
(Continued)

ing a path having a highest third likelihood, and generating a summary based on the path.

8 Claims, 4 Drawing Sheets

(51) Int. Cl.
    *G06F 16/901*     (2019.01)
    *G06F 40/279*     (2020.01)
    *G06F 40/30*     (2020.01)
    *G06F 40/40*     (2020.01)

(52) U.S. Cl.
    CPC ............ *G06F 40/279* (2020.01); *G06F 40/30* (2020.01); *G06F 40/40* (2020.01)

(58) Field of Classification Search
    USPC ........................................................ 704/9
    See application file for complete search history.

(56) References Cited

FOREIGN PATENT DOCUMENTS

| KR | 10-1548096 | 8/2015 |
|----|------------|--------|
| KR | 10-2019-0042257 | 4/2019 |

OTHER PUBLICATIONS

English translation of office action for Korea App. No. 10-2020-0167223.
Search Report from European App. No. 20214578, dated Apr. 8, 2021.
Extended Search Report from European App. No. 20214578, dated Apr. 19, 2021.
Office Action issued Sep. 28, 2022 for Korea App. No. 10-2020-0167223, 6 pages.
Excelsior, "Document summary using TextRank." Downloaded from https://excelsior-cjh.tistory.com/93; posted Jun. 12, 2017, with English translation, 17 pages.

METHOD AND SYSTEM FOR IMPROVING PERFORMANCE OF TEXT SUMMARIZATION

CROSS-REFERENCE TO RELATED APPLICATIONS

This application is a Continuation application of U.S. application Ser. No. 17/125,991 filed Dec. 17, 2020, which claims priority to and the benefit of Korean Patent Application No. 10-2020-0167223, filed Dec. 3, 2020, the disclosure of which is incorporated herein by reference in its entirety.

BACKGROUND OF THE INVENTION

Field of the Invention

The present invention relates to a method and a system for improving performance of text summarization, and more specifically, to a method and a system for improving performance by adding abstraction to a text summarization algorithm generally used.

Description of the Related Art

Development of Internet and an increase in penetration rate of smart devices result in an increase in text data, and thus the importance of a document summarization technique for extracting main content from a massive amount of text data is emphasized. The document summarization technique is divided into a generative summarization technique and an abstractive summarization technique. The generative summarization technique is a difficult technique as it generates new text through understanding the context of text. In this respect, since the abstractive summarization technique for summarizing text by abstracting words used in a document is widely used as the document summarization technique, there is a limit of expressiveness and vocabularies in summarization.

SUMMARY OF THE INVENTION

The invention is made to solve the above-described problems, and an object thereof is to improve performance of a technique for generating a summary from a given paragraph.

In addition, another object of the invention is to improve performance by reinforcing abstract characteristics of text in generating a summary.

According to the invention to achieve the objects, there is provided a method for improving performance of text summarization which is fulfilled by a summary generating device, the method including: an a step of generating an embedding vector by vectorizing a natural language-based context; a b step of generating a graph using the embedding vector and calculating a first likelihood of each of at least one node included in the graph; a c step of generating a second likelihood by assigning a weight to the first likelihood according to a result of comparing at least one node included in the graph with the context; and a d step of calculating a third likelihood for all candidate paths present in the graph based on the second likelihood, selecting a path having a highest third likelihood in the graph and generating a summary based on the path.

According to the invention, there is provided a system for improving performance of text summarization, including: a summary generating device that vectorizes a natural language-based context to generate an embedding vector, generates a graph using the embedding vector, calculates a first likelihood of each of at least one node included in the graph, generates a second likelihood by assigning a weight to the first likelihood according to a result of comparing at least one node included in the graph with the context, calculates a third likelihood for all candidate paths present in the graph based on the second likelihood, selects a path having a highest third likelihood to generate a summary based on the path, and adjusts a learning parameter used for determining the weight based on feedback when the feedback for the summary is received from a summary evaluating device; and a summary evaluating device that calculates similarity between the summary generated by the summary generating device and a summary generated by a person in advance for the context and generates feedback depending on whether the similarity is higher than or equal to a preset threshold value.

DETAILED DESCRIPTION OF THE PREFERRED EMBODIMENTS

Figure 1:
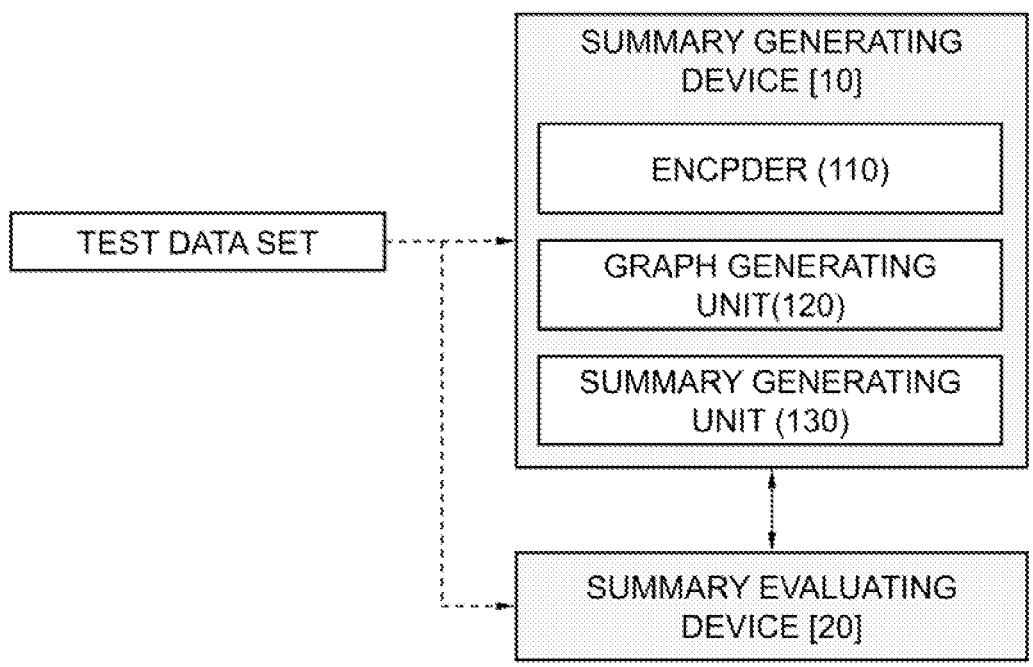
FIG. 1 is a diagram illustrating a configuration of an apparatus for improving performance of text summarization according to an embodiment of the invention.

The above-mentioned objects, features, and advantages will be described below in detail with reference to the accompanying drawings, and thus a person of ordinary knowledge in the technical field to which the invention belongs can easily embody technical ideas of the invention. In the description of the invention, when detailed description of a known technology related to the invention is deemed to result in blurring the gist of the invention unnecessarily, the detailed description thereof will be omitted.

The same reference signs are used to represent the same or similar configurational elements in the drawings, and every combination described in this specification and claims can be combined in any manner. Besides, unless otherwise defined, a mention of a singular item may mean one or more items, and a mention of a singular form may also mean a plural form.

Terms used in this specification are used to describe only specific examples and are not intended to limit the invention thereto. Words in a singular form as used in this specification can also be intended to have a meaning of a plural form thereof, unless otherwise clearly described in a corresponding sentence. Terms such as "and/or" mean that all combinations of items listed as related and any one item are included. Terms such as "include", "to include", "including", "comprising", "to have", or "having" have connotative meanings, and thus the terms specify a described feature, integer, step, operation, element, and/or component and do not exclude presence or addition of one or more other features, integers, steps, operations, elements, components, and/or a group thereof. Steps, processes, operations of a method described in this specification do not have to be understood to be necessarily executed in the specific order described or illustrated here, unless an execution order thereof is specifically and absolutely fixed. It should be understood that additional or alternative steps can be used.

In addition, configurational elements can be realized with respective hardware processors, the configurational elements can be integrated to be realized in one hardware processor, or the configurational elements can be combined with each other to be realized in a plurality of hardware processors.

Hereinafter, preferred embodiments according to the invention will be described in detail with reference to the accompanying drawings.

FIG. 1 is a diagram illustrating a configuration of an apparatus for improving performance of text summarization according to an embodiment of the invention.

With reference to FIG. 1, the apparatus for improving performance of text summarization according to the embodiment of the invention is configured to include a summary generating device 10 and a summary evaluating device 20, trains the summary generating device 10 using a learning data set, and learns through a process of evaluating by the summary evaluating device 20 the summary generated by the summary generating device 10 using a test data set. According to the invention, the process can improve performance of the summary generating device 10 so as to achieve an effect of enhancing a quality of a summary.

In addition, the apparatus for improving performance of text summarization according to the embodiment of the invention is technically characterized in that a summary generated by using a test data set is evaluated to improve performance of the summary generating device 10, and thus learning of the summary generating device 10 by using a learning data set can be performed using a technique in the related art.

Summary Generating Device 10

Generally, a method for generating a summary for a document is fulfilled with a greedy search algorithm or a beam search algorithm. With the greedy search algorithm, a keyword having a highest likelihood is selected at each step in selecting a keyword (word) to generate a summary, and thus the best keyword is selected for each step; however, there is a case where a finally output summary is not the best result.

Figure 2:
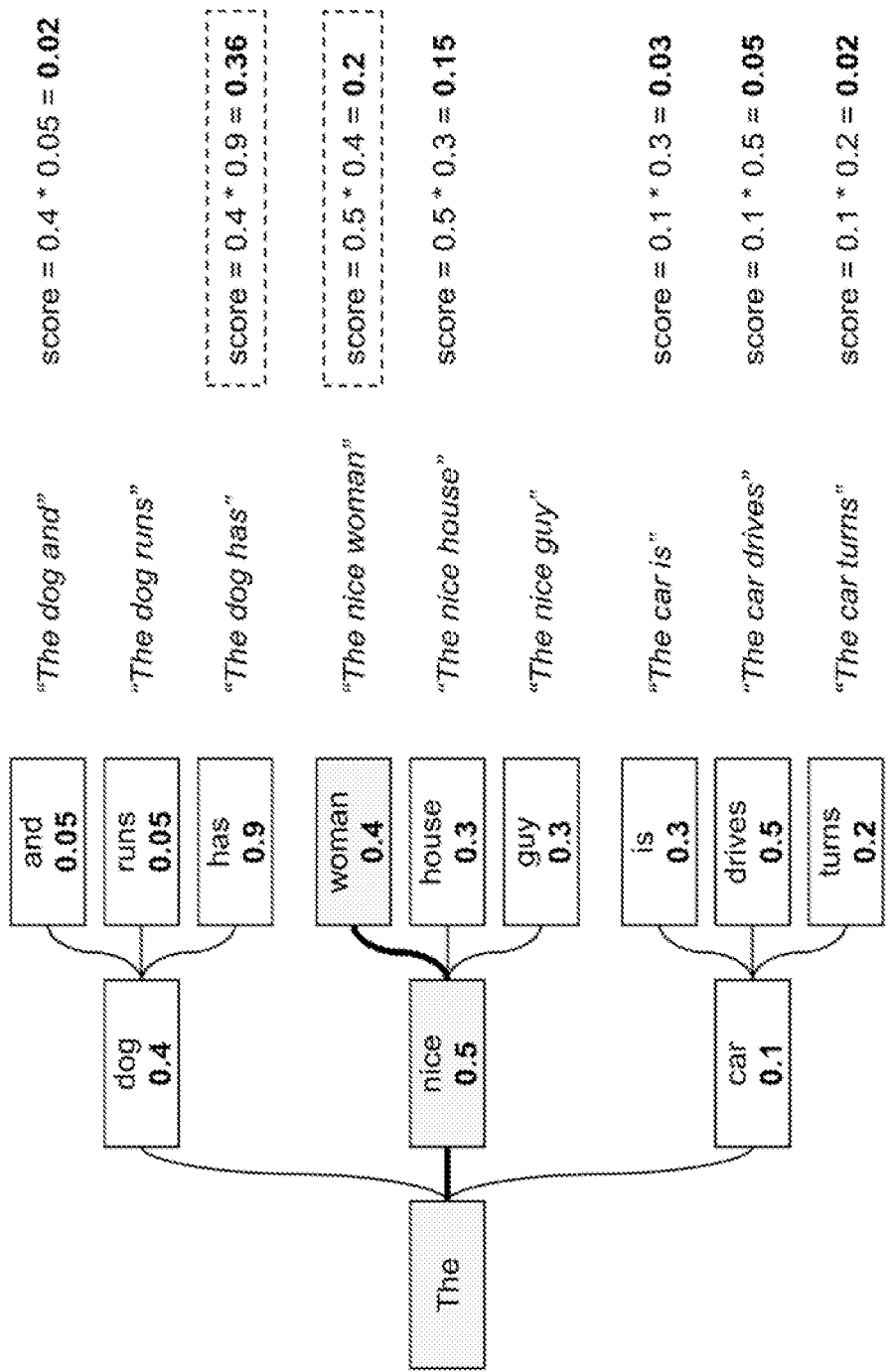
FIG. 2 is a diagram illustrating a graph generated by an existing greedy search algorithm.

FIG. 2 is a diagram illustrating a graph generated by an existing greedy search algorithm. With reference to FIG. 2, when a sentence is generated by the greedy search algorithm, a node "nice" having the highest likelihood is selected from nodes "dog", "nice", and "car", then "woman" having the highest likelihood is selected from child nodes "woman", "house", and "guy" of the node "nice", and a path of "The nice woman" is selected. However, when likelihoods of all paths are calculated overall, a path of "The dog has" (likelihood: 0.36) has higher likelihood the path of "The nice woman" (likelihood: 0.2), and thus it can be known that "The nice woman" is not the optimal selection.

Hence, the summary generating device 10 according to the embodiment of the invention generates a summary by employing the beam search algorithm obtained by supplementing shortcomings of the greedy search algorithm.

The summary generating device 10 according to the embodiment of the invention is configured to include an encoder 110, a graph generating unit 120, and a summary generating unit 130 and can generate a summary based on a test data set.

The encoder 110 is included at least one and generates an embedding vector corresponding to a context of the test data set. The embedding vector is a vector indicating a structure and meaning of a document written in a natural language. The encoder 110 can be configured of a neural network and can be a neural network model learned so as to generate the embedding vector.

The graph generating unit 120 can generate a graph based on the embedding vector. The graph generating unit 120 can generate a graph based on the beam search algorithm, and thus can generate the graph through a plurality of steps.

The graph generating unit 120 can, at a first step, select a first keyword and can generate a first node corresponding to the first keyword. The graph generating unit 120 generates m second nodes which are child nodes of the first node at a second step and can generate m third nodes which are child nodes of the second node at a third step. In generating, the graph generating unit 120 expands the graph by repeating the process to a preset depth of the graph.

In the embodiment of the invention, m represents a beam size of the beam search algorithm and can be changed depending on setting by a user, and a process of abstracting m beam nodes is performed using a technique in the related art.

A first to n-th nodes (n=number of steps) included in the graph generated by the graph generating unit 120 have a unique first likelihood which is set in accordance with a technique in the related art. The first likelihood according to the embodiment of the invention is used as a basis on which the summary generating device 10 according to the embodiment of the invention selects a keyword to generate a summary.

When the graph generating unit 120 according to the embodiment of the invention generates the first to n-th nodes of the graph, the graph generating unit can determine whether or not a keyword corresponding to each node is present in a document (context) in order to abstract the nodes and assign a weight to calculate a second likelihood for each node.

Specifically, the graph generating unit 120 can determine whether a keyword corresponding to each node is present in the context through comparison between the nodes and the embedding vector corresponding to the context. When a keyword corresponding to a node is included in the context, that is, when an embedding vector equal to a node is present, the graph generating unit 120 does not assign a weight to the node. In addition, when a keyword is not present, a weight (for example, 1) can be assigned thereto. In this manner, learning to include a keyword, which is not present in a document, in a summary that is generated according to the embodiment of the invention is performed to reinforce abstractness.

Figure 3:
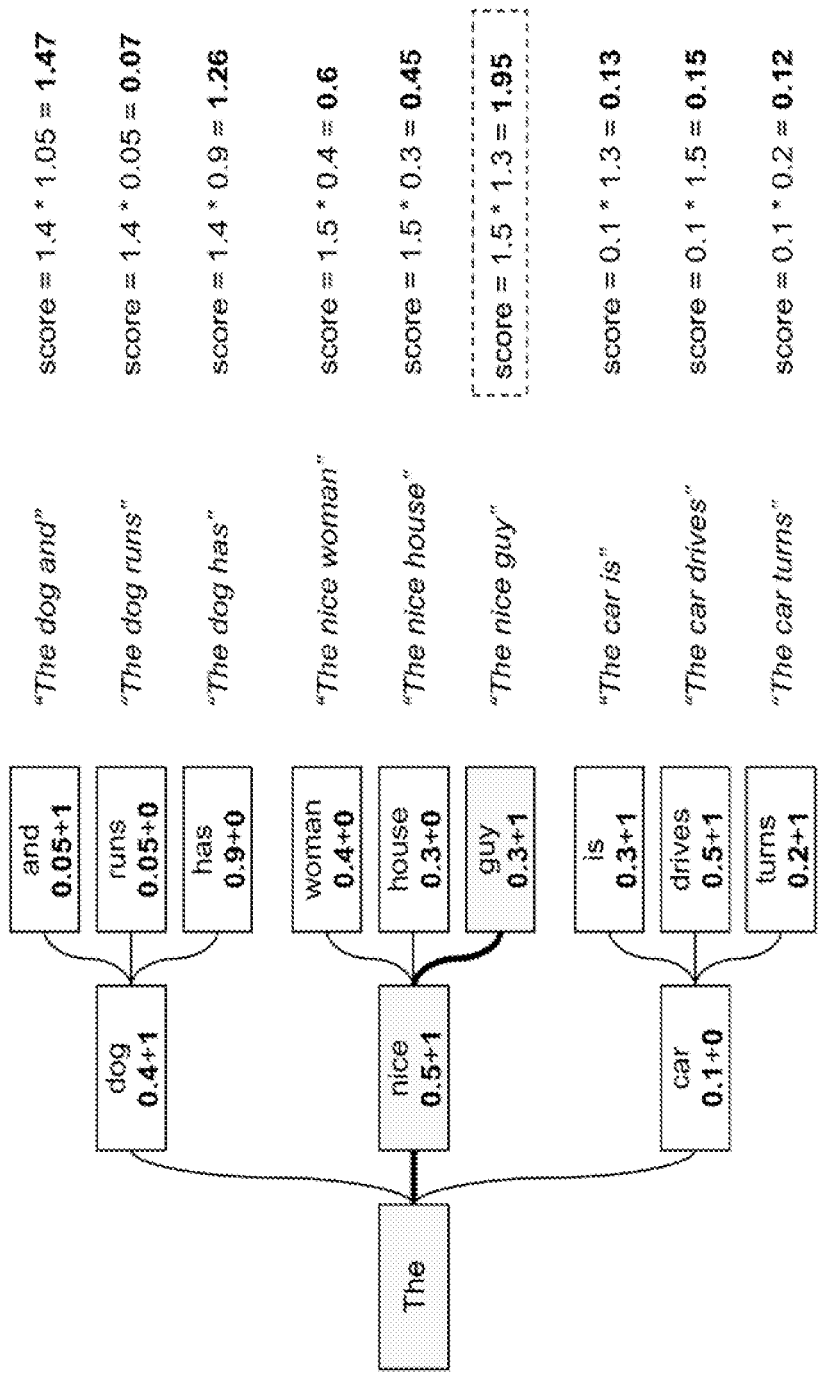
FIG. 3 is a diagram illustrating a graph generated by the apparatus for improving performance of text summarization according to the embodiment of the invention.

To describe a process of assigning a weight with reference to FIG. 3, when words (keywords) of "runs", "has", "woman", "house", and "car" are used in a document, the graph generating unit 120 assigns a weight of 0 to nodes corresponding to "runs", "has", "woman", "house", and "car" which are words (keywords) that are included in the document and assigns a weight of 1 to nodes corresponding to "dog", "and", "nice", "guy", "is", "drives", and "turns" which are words (keywords) that are not included in the document.

In assigning a weight to a node, the graph generating unit 120 can generate a second likelihood of the node by adding a weight to a first likelihood (point) calculated for the node in advance. For example, when a first likelihood of a second node "dog" is 0.4 and a weight of 1 is assigned thereto, the graph generating unit 120 can set the second likelihood of the second node "dog" to 1.4.

The summary generating unit 130 can select a path having a highest third likelihood based on a generated second likelihood of a node. The summary generating unit 130 can calculate third likelihoods for all candidate paths from a first node to an n-th node and can select a path having a highest third likelihood.

The summary generating unit 130 calculates the third likelihoods of all of the candidate paths based on second likelihoods (points) of the first to n-th nodes. The summary generating unit 130 can calculate a third likelihood for a candidate path from the first node to n-th node by multiplying the second likelihoods of the nodes (first to n-th nodes). For example, with reference to FIG. 3, the summary generating unit 130 can calculate a third likelihood for a candidate path of a first node "The"—a second node "dog"—a third node "and" as 1.4×1.05=1.47 and can calculate a third likelihood for a candidate path of a first node "The"—a second node "dog"—a third node "has" as 1.4× 0.9=1.26. The summary generating unit 130 can calculate the third likelihoods for all of the candidate paths in the graph generated by the beam search algorithm.

The summary generating unit 130 can generate a sentence of a summary based on the nodes included in the path having the highest third likelihoods among candidate paths. According to an example in FIG. 3, a third likelihood of a path of a first node "The"—a second node "nice"—a third node "guy" has the highest value as 1.95, and thus "The nice guy" is generated as a sentence of a summary. When the summary generating unit 130 generates a summary including at least one sentence, the summary generating unit transmits the summary to the summary evaluating device 20.

The summary generating unit 130 adjusts a learning parameter used for determining a weight for a node based on feedback for a summary received from the summary evaluating device 20, and thereby the summary generating unit can learn to generate a better summary.

Summary Evaluating Device 20

The summary evaluating device 20 can evaluate a summary generated by the summary generating device 10. In evaluating the summary, the summary evaluating device 20 can evaluate the summary by comparing a summary generated by a person for a context (document) of a pre-stored test data set and the summary generated by the summary generating device 10.

The summary evaluating device 20 can calculate similarity between the summary by a person and the generated summary and can provide positive feedback to the summary generating device 10 when the calculated similarity is equal to or higher than a preset threshold value, and provide negative feedback to the summary generating device when the calculated similarity is lower than the threshold value.

Figure 4:
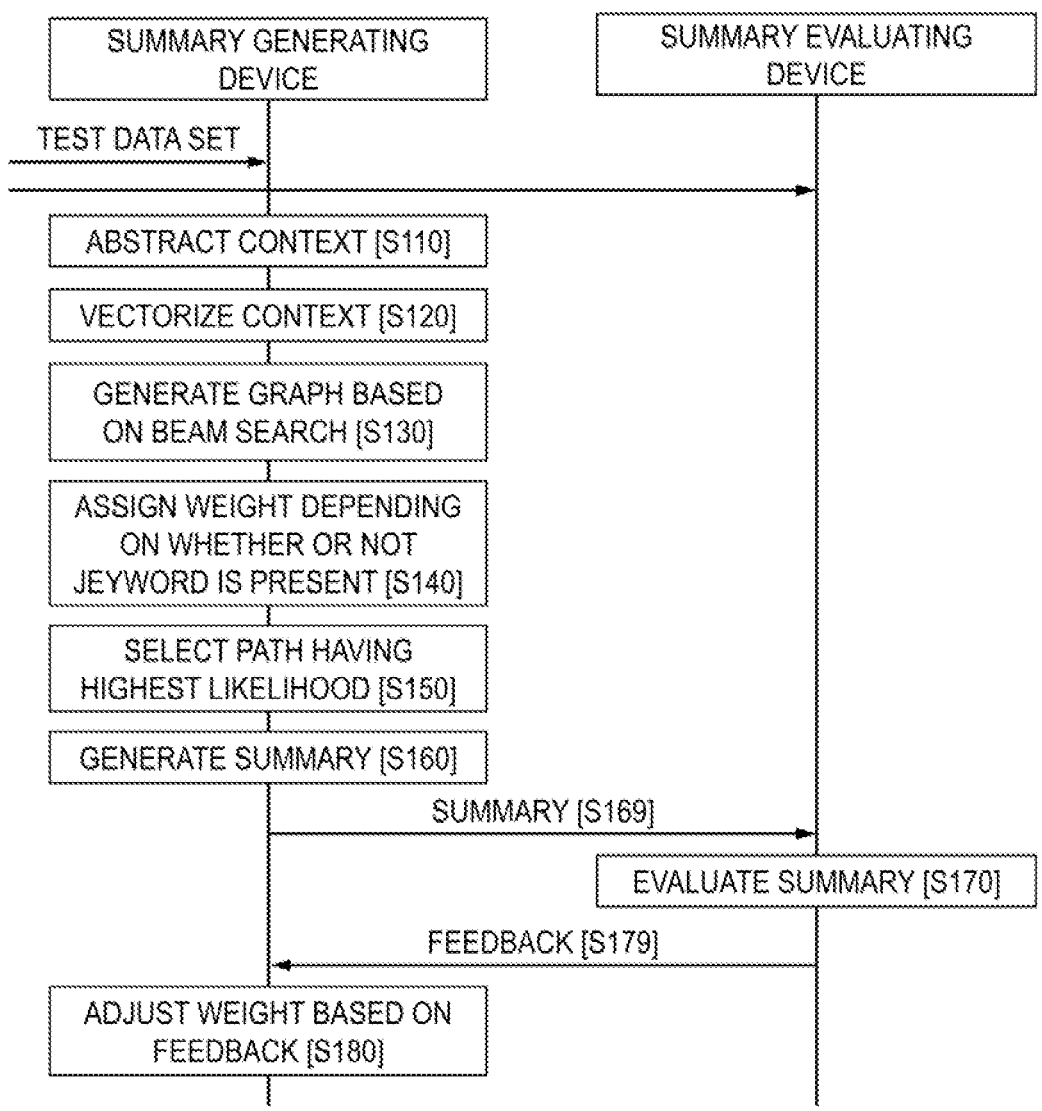
FIG. 4 is a flowchart illustrating a method for improving performance of text summarization according to another embodiment of the invention.

FIG. 4 is a flowchart illustrating a method for improving performance of text summarization according to another embodiment of the invention. Hereinafter, the method for improving performance of text summarization will be described with reference to FIG. 4. To describe the method for improving performance of text summarization, the same detailed embodiments as those of the above-mentioned system for improving performance of text summarization may be omitted.

The summary generating device 10 can acquire a context (document) from a test data set (S110). The context of the test data set can be provided by sentence unit in a natural language.

The summary generating device 10 can vectorize a context of the test data set (S120). The summary generating device 10 can convert the context into a vector by using an encoder to generate an embedding vector.

The summary generating device 10 can generate a graph based on the beam search algorithm by using the embedding vector (S130). The summary generating device 10 can generate a graph based on the beam search algorithm, thus generating the graph through a plurality of steps. Specifically, the summary generating device 10 can, at a first step, select a first keyword and generate a first node corresponding to the first keyword and can generate m second nodes which are child nodes of the first node at a second step. Here, m represents a beam size of the beam search algorithm and can be changed depending on setting by a user, and a process of abstracting nodes can be performed in accordance with a technique in the related art.

The first to n-th nodes (n=number of steps) included in the graph generated by the summary generating device 10 have a unique first likelihood which is set in accordance with a technique in the related art. The likelihood according to the embodiment of the invention is used as a basis on which the summary generating device 10 according to the embodiment of the invention selects a keyword to generate a summary.

In addition, when the summary generating device 10 generates the first to n-th nodes of the graph, the summary generating device can determine whether or not a keyword corresponding to each node is present in a document (context) to abstract the nodes and assign a weight to calculate a second likelihood for each node (S140).

Specifically, the summary generating device 10 can determine whether a keyword corresponding to each node is present through comparison between the nodes and the embedding vector corresponding to the context. When an embedding vector equal to a node is present, the summary generating device 10 does not assign a weight to the node. In addition, when a keyword is not present, a weight (for example, 1) can be assigned thereto. In this manner, learning to include a keyword, which is not present in a document, in a summary that is generated according to the embodiment of the invention is performed to reinforce abstractness.

In assigning a weight to a node, the summary generating device 10 can generate a second likelihood of the node by adding a weight to a first likelihood (point) calculated for the node in advance. For example, when the first likelihood of the second node "dog" is 0.4 and a weight of 1 is assigned thereto, the summary generating device 10 can set the second likelihood of the second node "dog" to 1.4.

The summary generating device 10 can select a path having the highest third likelihood based on a second likelihood of a node (S150). The summary generating device 10 can calculate third likelihoods for all candidate paths from the first node to the n-th node and can select a path having the highest third likelihood from the candidate paths.

Specifically, the summary generating device 10 calculates the third likelihoods of all of the candidate paths based on second likelihoods (points) of the first to n-th nodes. The summary generating device 10 can calculate a third likelihood for a candidate path from the first node to n-th node by multiplying weights of the nodes (first to n-th nodes). The summary generating device 10 can calculate the third likelihoods for all of the candidate paths in the graph generated by the beam search algorithm.

The summary generating device 10 can generate a sentence of a summary based on the nodes included in the path having the highest third likelihoods among the candidate paths and can generate a summary including a plurality of sentences through the process described above (S160).

The summary generating device 10 can transmit the summary to the summary evaluating device 20 (S169).

The summary evaluating device 20 can evaluate a summary generated by the summary generating device 10 (S170). In evaluating the summary, the summary evaluating device 20 can evaluate the summary by comparing a summary generated by a person for a context (document) of a pre-stored test data set and the summary generated by the summary generating device 10.

Specifically, the summary evaluating device 20 can calculate similarity between the summary by a person and the generated summary and can provide positive feedback to the summary generating device 10 when the calculated similarity is equal to or higher than the preset threshold value, and provide negative feedback to the summary generating device when the calculated similarity is lower than the threshold value (S179).

When the summary generating device 10 receives the feedback for the summary from the summary evaluating device 20, the summary generating device can adjust a learning parameter used for determining a weight value based on the feedback (S180). The summary generating device 10 adjusts the learning parameter used in generating the summary, and thereby the summary generating device can learn to generate a better summary and can generate a summary having a high quality.

According to the invention as described above, a summary is generated using not only words in a document but also words learned before, and thereby it is possible to reinforce abstract characteristics of a text and improve performance of a technique for generating a summary from a given paragraph. In addition, according to the invention, an output value of a model that generates a summary is evaluated and a weight is assigned, and thereby it is possible to enhance performance of a summary generating model.

The embodiments of the invention disclosed in this specification and the drawings are provided only as specific examples for simple description of technical content of the invention and for easy understanding of the invention, and the embodiments of the invention are not provided to limit the scope of the invention. It is obvious to a person of ordinary knowledge in the technical field to which the invention belongs that it is possible to implement other modification examples based on the technical ideas of the invention, in addition to the embodiments disclosed here.

What is claimed is:

1. A method for improving performance of text summarization which is fulfilled by a summary generating device, the method comprising:
    an a step of generating an embedding vector by vectorizing a natural language-based context;
    a b step of generating a graph using the embedding vector and calculating a first likelihood of each of a plurality of nodes included in the graph;
    a c step of generating a second likelihood of each of the plurality of nodes by assigning a weight to the first likelihood according to a result of comparing each of the plurality of nodes included in the graph with the context; and
    a d step of calculating a third likelihood for all candidate paths present in the graph based on the second likelihood, selecting a path having a highest third likelihood among the candidates paths, and generating a summary based on the path.

2. The method for improving performance of text summarization according to claim 1, wherein the graph is generated based on a beam search algorithm.

3. The method for improving performance of text summarization according to claim 2, wherein, in the c step, when no keyword corresponding to a node is present in the context, the second likelihood is generated by assigning a weight to the first likelihood of the node.

4. The method for improving performance of text summarization according to claim 3, wherein, in the d step, the third likelihood is calculated by multiplying second likelihoods of nodes included in the path.

5. The method for improving performance of text summarization according to claim 1, further comprising:
    a step of transmitting the generated summary to a summary evaluating device;
    a step of receiving feedback for the summary from the summary evaluating device; and
    a step of adjusting a learning parameter used for determining the weight based on the feedback.

6. The method for improving performance of text summarization according to claim 5, wherein the feedback is generated depending on whether similarity is higher than or equal to a preset threshold value by calculating the similarity between the generated summary and a summary generated by a person in advance for the context.

7. A system for improving performance of text summarization, comprising:
    a summary generating device that vectorizes a natural language-based context to generate an embedding vector, generates a graph using the embedding vector, calculates a first likelihood of each of a plurality of nodes included in the graph, generates a second likelihood of each of the plurality of nodes by assigning a weight to the first likelihood according to a result of comparing each of the plurality of nodes included in the graph with the context, calculates a third likelihood for all candidate paths present in the graph based on the second likelihood, selects a path having a highest third likelihood among the candidate paths to generate a summary based on the path, and adjusts a learning parameter used for determining the weight based on feedback when the feedback for the summary is received from a summary evaluating device; and
    a summary evaluating device that calculates similarity between the summary generated by the summary generating device and a summary generated by a person in advance for the context and generates feedback depending on whether the similarity is higher than or equal to a preset threshold value.

8. The system for improving performance of text summarization according to claim 7, wherein the summary generating device:
    generates a second likelihood by assigning a weight to a first likelihood of a node when no keyword corresponding to the node is present in the context based on the first likelihood of each of the plurality of nodes included in the graph; and
    calculates the third likelihood by multiplying second likelihoods of nodes included in the candidate paths.

* * * * *